(12) United States Patent
Ochi et al.

(10) Patent No.: US 6,941,752 B2
(45) Date of Patent: Sep. 13, 2005

(54) STATOR SUPPORT DEVICE AND TORQUE CONVERTER INCLUDING THE SAME

(75) Inventors: Toru Ochi, Toyota (JP); Hiroaki Takeuchi, Toyota (JP); Yuji Yasuda, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 24 days.

(21) Appl. No.: 10/682,913

(22) Filed: Oct. 14, 2003

(65) Prior Publication Data

US 2004/0076522 A1 Apr. 22, 2004

(30) Foreign Application Priority Data

Oct. 15, 2002 (JP) ........................................ 2002-300209

(51) Int. Cl.[7] ............................................. F16D 33/18
(52) U.S. Cl. ............................................ 60/345; 60/339
(58) Field of Search ........................ 60/339, 345, 361, 60/362, 365

(56) References Cited

U.S. PATENT DOCUMENTS

| | | | |
|---|---|---|---|
| 5,125,487 A | * | 6/1992 | Hodge .......................... 60/345 |
| 5,640,849 A | * | 6/1997 | Abe et al. ..................... 60/361 |
| 5,706,656 A | * | 1/1998 | Hinkel ......................... 60/345 |
| 6,289,674 B1 | * | 9/2001 | Halene et al. ................. 60/365 |

FOREIGN PATENT DOCUMENTS

| | | |
|---|---|---|
| JP | 62-82453 | 5/1987 |
| JP | 7-16049 | 3/1995 |
| JP | 8-326866 | 12/1996 |
| JP | 11-153207 | 6/1999 |
| JP | 2000-291774 | 10/2000 |
| JP | 2001-82511 | 3/2001 |
| JP | 2001-323985 | 11/2001 |
| JP | 2001-527194 | 12/2001 |
| WO | WO 01/23778 | 4/2001 |

* cited by examiner

*Primary Examiner*—Edward K. Look
*Assistant Examiner*—Michael Leslie
(74) *Attorney, Agent, or Firm*—Oblon, Spivak, McClelland, Maier & Neustadt, P.C.

(57) ABSTRACT

A stator support device for supporting a stator of a torque converter includes a one-way coupling device including an outer race disposed radially inwardly of the stator, and an inner race disposed radially outwardly of a rotation axis of the torque converter, an end bearing that holds a spacing between the outer race and the inner race, a thrust bearing race disposed adjacent to an end face of the outer race and arranged to restrict movements of the end bearing in a direction of the rotation axis, and a thrust bearing disposed at a transfer surface of the thrust bearing race and adapted to bear a load applied to the one-way coupling device.

6 Claims, 8 Drawing Sheets

STATOR SUPPORT DEVICE AND TORQUE CONVERTER INCLUDING THE SAME

INCORPORATION BY REFERENCE

The disclosure of Japanese Patent Application No. 2002-300209 filed on Oct. 15, 2002, including the specification, drawings and abstract, is incorporated herein by reference in its entirety.

BACKGROUND OF THE INVENTION

1. Field of the Invention

The invention relates to a torque converter installed on a vehicle, and, more particularly, to a technique for supporting a stator of the torque converter.

2. Description of Related Art

A torque converter for multiplying torque generated by a power source and transmitting the torque to the next power transmission stage includes an impeller called "stator". The stator is mounted on a rotary shaft via a one-way clutch, and is operable to direct flow of working oil from a turbine runner toward an inlet of a pump impeller.

Figure 13:
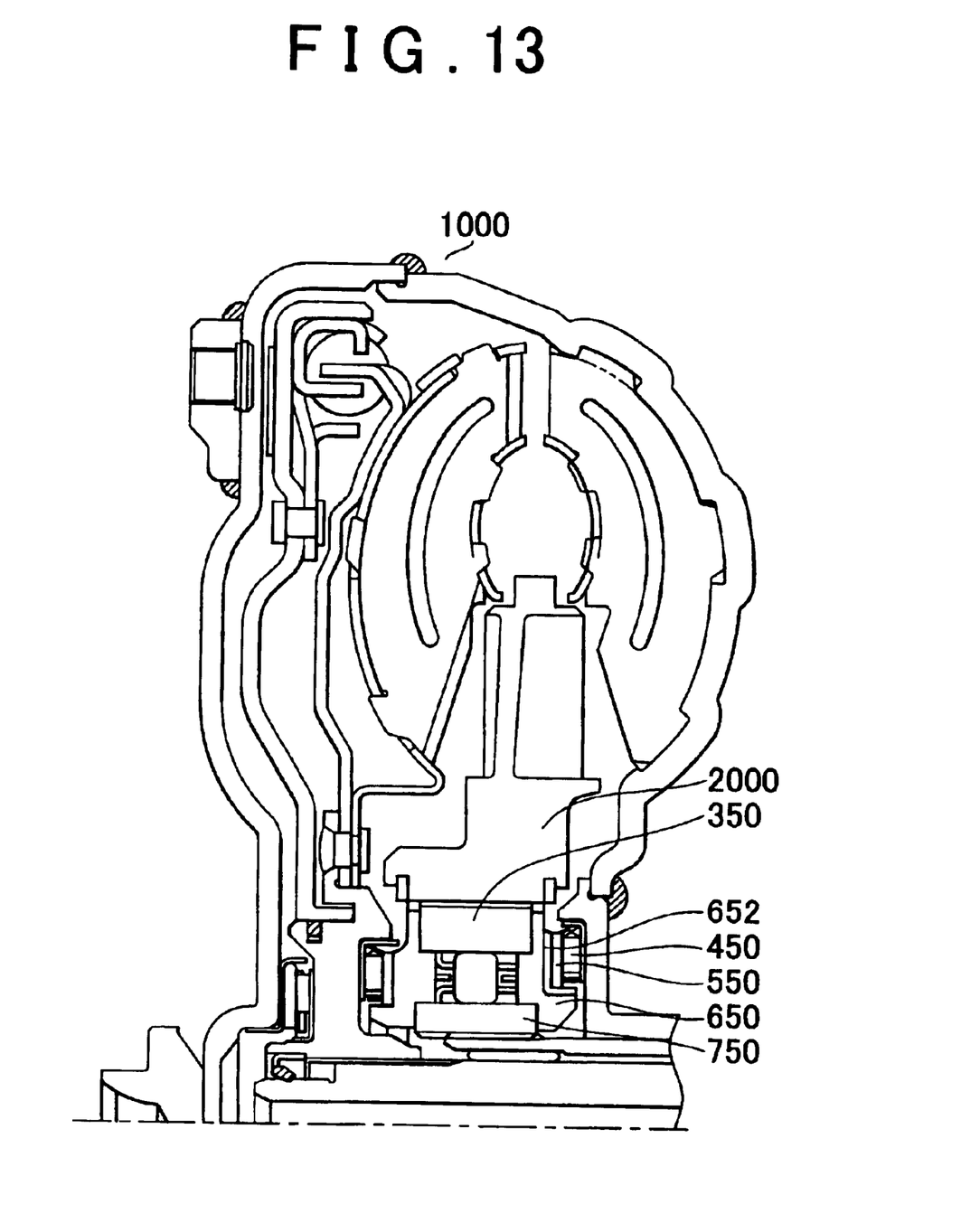
FIG. 13 is a view showing the construction of a torque converter including a conventional stator support device.

FIG. 13 shows a torque converter 1000 including a conventional support device of a stator 2000. Referring to FIG. 13, an aluminum washer 650 holds or maintains the spacing between a one-way clutch outer race 350 and a one-way clutch inner race 750. The aluminum washer 650 bears a load applied to a thrust bearing 450, via a thrust bearing race 550. In this case, the aluminum washer 650 that receives the load is required to have a sufficiently large thickness as measured in the axial direction, to provide sufficiently high rigidity. In fabrication of the conventional support device, the aluminum washer 650 is attached to the one-way clutch, and the thrust bearing 450 is further disposed outside the aluminum washer 650, resulting in an increase in the axial length of the device.

In the stator support device constructed as described above, the lifetimes of the one-way clutch and the thrust bearing 450 are influenced by loads received in the axial direction and radial directions. The lifetime of the stator is also influenced by such loads. In order to maintain the life of the stator, therefore, it is necessary to appropriately bear or sustain the loads, restrict "deviation" of the mounting position of the stator relative to the rotation axis, and provide sufficient lubrication. In addition to these requirement associated with the life of the stator, a demand for a reduction in the axial dimension of the stator is increasing so as to make the torque converter small-sized.

Japanese Laid-open Patent Publication No. 2001-323985 discloses a stator device having a reduced axial length. The stator device includes an outer wheel fixed on the inner circumference of the stator, an inner wheel disposed coaxially with the outer wheel, an end bearing that keeps a clearance or spacing between the outer wheel and the inner wheel, and a thrust washer composed of a bimetallic material used for bearings. The thrust washer serves to restrict axial movements of a one-way coupling device, such as a one-way clutch.

In the stator device as described above, the clearance between the outer and inner wheels is maintained by the end bearing, and the axial movements of the one-way coupling device is restricted by the thrust washer. With this arrangement, the length of a portion that supports the stator can be reduced to be shorter than the axial length of a conventional aluminum bushing.

Laid-open Publication No. 7-16049 of Japanese Utility Model Application discloses a stator support structure of a torque converter having a reduction axial dimension. The stator support structure includes an outer race fixed to a stator carrier of a stator, an inner race disposed radially inwardly of the outer race, a one-way clutch that permits rotation of the outer race only in one direction, and a support member disposed at a side face of the one-way clutch that is closer to a pump impeller.

In the stator support structure as described above, the support member is disposed at the side face of the one-way clutch closer to the pump impeller so as to support the outer race, inner race, and the one-way clutch. By providing the support member, in place of an radially inward flange formed integrally with the stator carrier, the axial dimension of a mounting portion of the stator can be reduced.

In the stator device disclosed in JP-A-2001-323985, since the thrust bearing race needs to receive a load from the thrust bearing and transmit the load to the stator, the thrust bearing race is required to have sufficiently high rigidity, resulting in an increase in the axial length of the race. Also, oil grooves for lubrication are needed for preventing wear due to frictional contacts with the inner race.

In the stator support structure disclosed in JP-U-7-16049, the dimensional accuracy of the clearance between the inner race and the outer race of the one-way clutch is reduced due to the use of the support member, and therefore the lifetime of the one-way clutch is reduced. Also, lubricant paths leading to the interior of the torque converter cannot be surely provided in the presence of the support member.

SUMMARY OF THE INVENTION

It is therefore an object of the invention to provide a stator support device, which has a reduced axial length and is free from a reduction in the lifetime due to, for example, poor lubrication. It is another object of the invention to provide a torque converter including such a stator support device.

To accomplish the above and/or other object(s), there is provided according to a first aspect of the invention a stator support device for supporting a stator of a torque converter, which comprises: (a) a one-way coupling device including an outer race disposed radially inwardly of the stator, and an inner race disposed radially outwardly of a rotation axis of the torque converter, (b) an end bearing that holds a spacing between the outer race and the inner race, (c) a thrust bearing race disposed adjacent to an end face of the outer race and arranged to restrict movements of the end bearing in a direction of the rotation axis, and (d) a thrust bearing disposed at a transfer surface of the thrust bearing race and adapted to bear a load applied to the one-way coupling device.

According the above aspect of the invention, the support device supports the stator of the torque converter. The stator is mounted on a rotary shaft (rotation axis) of the torque converter via the one-way coupling device. The end bearing of the support device appropriately holds or maintains the spacing between the outer race of the one-way coupling device disposed radially inwardly of the stator, and the inner race of the one-way coupling device disposed radially outwardly of the rotation axis. Accordingly, uniform or even loads are applied to the one-way coupling device, and an otherwise possible reduction in the lifetime of the one-way coupling device is avoided or suppressed. The thrust bearing race is disposed adjacent to an end face of the outer race. The thrust bearing race serves to restrict movements of the end bearing in the direction of the rotation axis. The thrust bearing is disposed adjacent to the thrust bearing race, and serves to bear a load applied to the one-way coupling device. Thus, the end face of the outer race receives the load applied to the thrust bearing, via the thrust bearing race. With this arrangement, since the rigidity of the outer race of the one-way coupling device is high enough to bear or sustain the load, the lifetime of the thrust bearing is prevented from being reduced or shortened. Also, the stator support device has a reduced axial length as compared with the case where the load is sustained by other component(s) (e.g., a thrust bearing race). Thus, the stator support device having a reduced axial length and improved lifetime is provided according to the first aspect of the invention.

In one preferred embodiment of the invention, the thrust bearing race is shaped so as to restrict movements of the end bearing and the inner race in the direction of the rotation axis.

In the stator support device according to the above embodiment, the thrust bearing race serves to restrict axial movements of the inner race of the one-way coupling device, as well as the end bearing. In this case, no additional component is needed for restricting the movements of the inner race, resulting in a reduction in the number of components that constitute the support device.

In another preferred embodiment of the invention, the outer race is provided with at least one oil groove.

In the stator support device according to the above embodiment, lubricating oil can be fed from the center of the stator in radial directions, via the oil grooves provided in the outer race, thus assuring sufficient lubrication of the interior of the torque converter.

According to a second aspect of the invention, there is provided a torque converter including the stator support device according to the first aspect of the invention or according to any one of the above-described embodiments.

The torque converter including the stator support device having the improved lifetime also has an improved lifetime. Thus, the torque converter having the improve lifetime is provided according to the second aspect of the invention.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein.

DETAILED DESCRIPTION OF EXEMPLARY EMBODIMENTS

Some exemplary embodiments of the invention will be described with reference to the accompanying drawings. In the following description, the same reference numerals are used for identifying the same components having the same names and functions, and detailed description of these components will not be repeated.

First Embodiment

Figure 1:
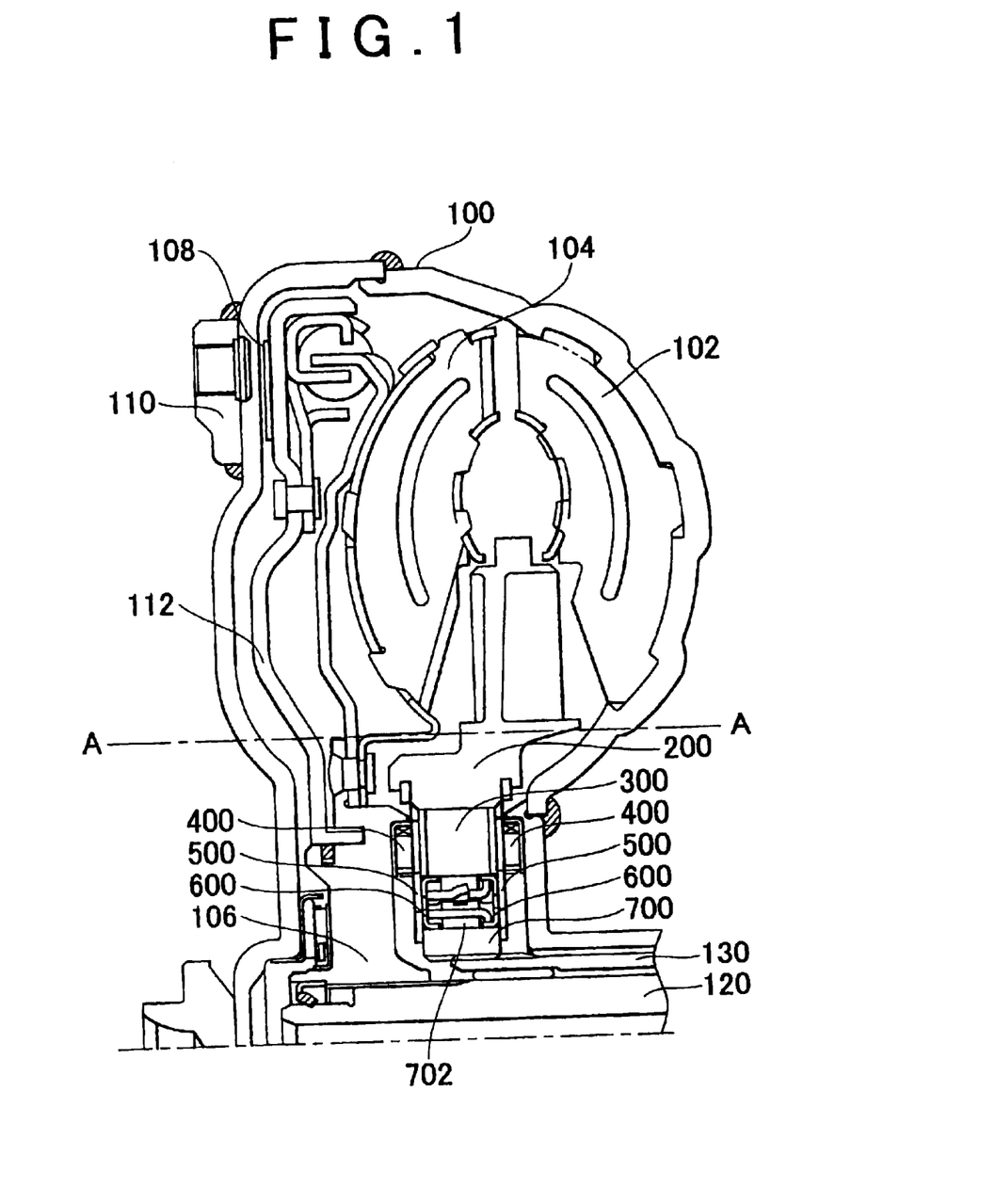
FIG. 1 is a view showing the construction of a torque converter including a stator support device according to a first embodiment of the invention.

Referring first to FIG. 1, the construction of a torque converter 100 including a stator support device according to a first embodiment of the invention will be described. The torque converter 100 includes a pump impeller 102, a turbine runner 104 and a stator 200. A one-way clutch (hereinafter referred to as "OWC") composed mainly of a one-way clutch outer race 300, a one-way clutch inner race 700 and sprags 702 is disposed at the inner circumference of the stator 200. The stator 200 is attached to a transmission stationary shaft 130 via the thus constructed OWC, such that the stator 200 is allowed to rotate only in one direction.

The pump impeller 102 is attached to an engine output shaft 110, and serves to convert the power of the engine (not shown) to into energy in the form of flow of working oil in the torque converter 100. The turbine runner 104 converts this energy into rotational energy, and rotates a transmission input shaft 120 to which a turbine hub 106 is attached, thereby to transmit torque to a transmission or speed-changing mechanism (not shown).

The stator 200 is disposed between the pump impeller 102 and the turbine runner 104. The stator 200 multiplies torque transmitted from the pump impeller 102 to the turbine runner 104. The stator 200 directs flow of working oil from the outlet of the turbine runner 104 toward the inlet of the pump impeller 102, so as to regulate flow of the working oil in the torque converter 100.

Figure 2:
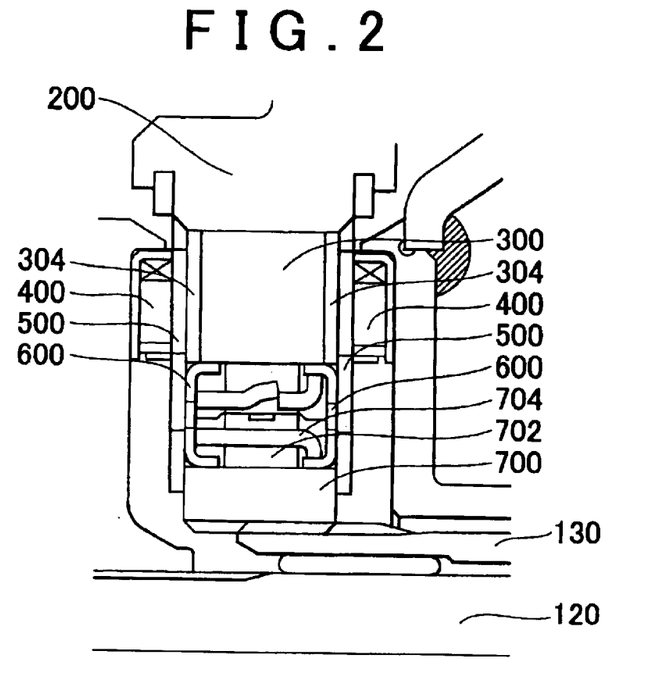
FIG. 2 is a view showing the construction of the stator support device according to the first embodiment of the invention.

Referring next to FIG. 2, the construction of the stator support device according to the present embodiment will be described. The one-way clutch including the OWC outer race 300 and the OWC inner race 700 is disposed radially outwardly of the transmission stationary shaft 130. A plurality of sprags 702 are disposed between the OWC outer race 300 and the OWC inner race 700. Each of the sprags 702 is held at a predetermined position by a cage 704. In addition, OWC end bearings 600 are disposed between the OWC outer race 300 and the OWC inner race 700. The OWC end bearings 600 function to keep the spacing between the OWC outer race 300 and the OWC inner race 700 constant. The OWC end bearings 600 also function to restrict movements of the sprags 702 in the axial direction.

Here, the axial direction means the direction in which the transmission stationary shaft 130 extends.

Thrust bearing races 500 are disposed at the opposite end faces of the OWC outer race 300 to be located adjacent to the OWC outer race 300. The thrust bearing races 500 function to restrict movements of the OWC end bearings 600 and the OWC inner race 700. To accomplish this function, the inside diameter of the thrust bearing race 500 is determined so that the race 500 covers the end face of the corresponding OWC end bearing 600 and at least a part of the end face of the OWC inner race 700 and so that the transmission stationary shaft 130 can pass through the thrust bearing race 500.

A surface of each of the thrust bearing races 500 is subjected to surface machining or surface treatment so that rolling elements (such as rollers or balls) of a bearing can smoothly roll on the surface. Thrust bearings 400 are disposed adjacent to the thrust bearing races 500 subjected to surface machining or surface treatment. With this arrangement, the axial end faces of the OWC outer race 300 can bear a load received by the thrust bearings 400, via the thrust bearing races 500.

Figure 3:
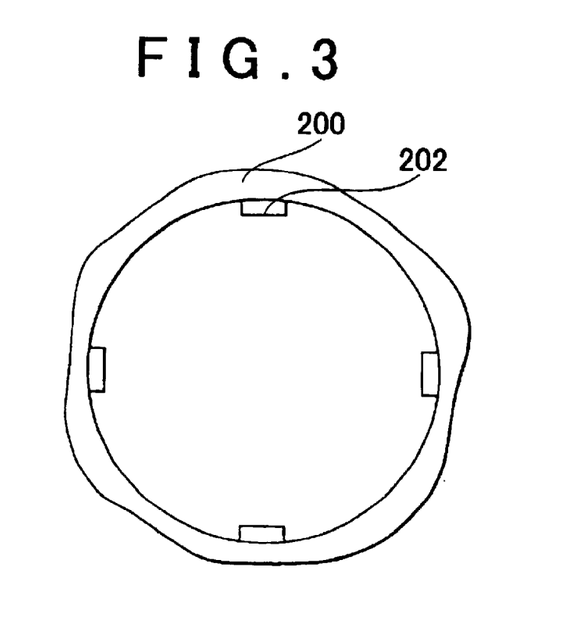
FIG. 3 is a cross-sectional view showing a wheel portion of the stator according to the first embodiment of the invention.

Referring to FIG. 3, the configuration of a wheel portion of the stator 200 according to the present embodiment will be described. FIG. 3 is a cross-sectional view of the wheel portion of the stator 200. Stator wheel claws 202 are provided on the wheel portion of the stator 200. The positions of the OWC outer race 300 and the stator 200 are determined by the stator wheel claws 202. The shape and number of the stator wheel claws and the positions at which the claws are provided are not particularly limited.

Figure 4:
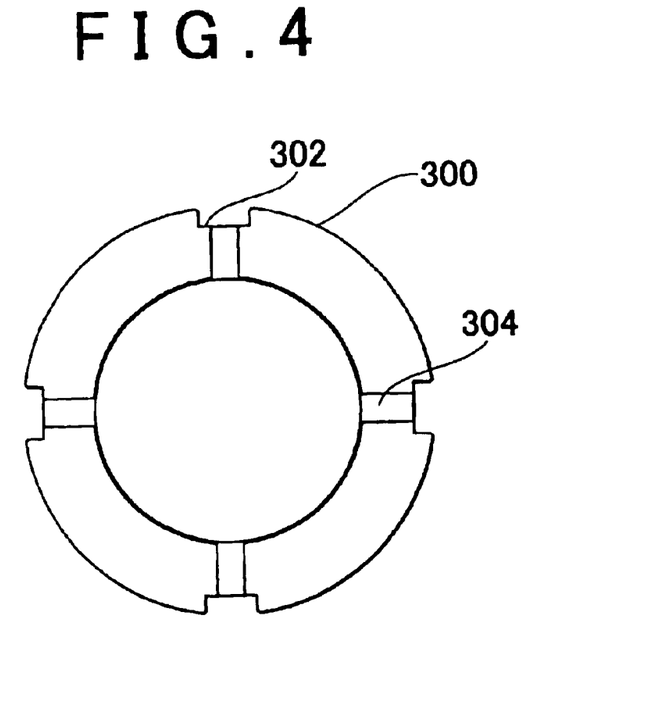
FIG. 4 is a view showing an end face of a one-way clutch outer race according to the first embodiment of the invention.

Referring next to FIG. 4, the configuration of the OWC outer race 300 according to the present embodiment will be described. FIG. 4 shows an end face of the OWC outer race 300. The OWC outer race 300 is provided with OWC outer race notches 302, which are positioned such that the stator wheel claws 202 (FIG. 3) engage with the notches 302. Oil grooves 304 are formed in the end face of the OWC outer race 300 to extend from the center of the outer race 300 toward the OWC outer race notches 302, so that lubricating oil can flow through the oil grooves 304.

Figure 5:
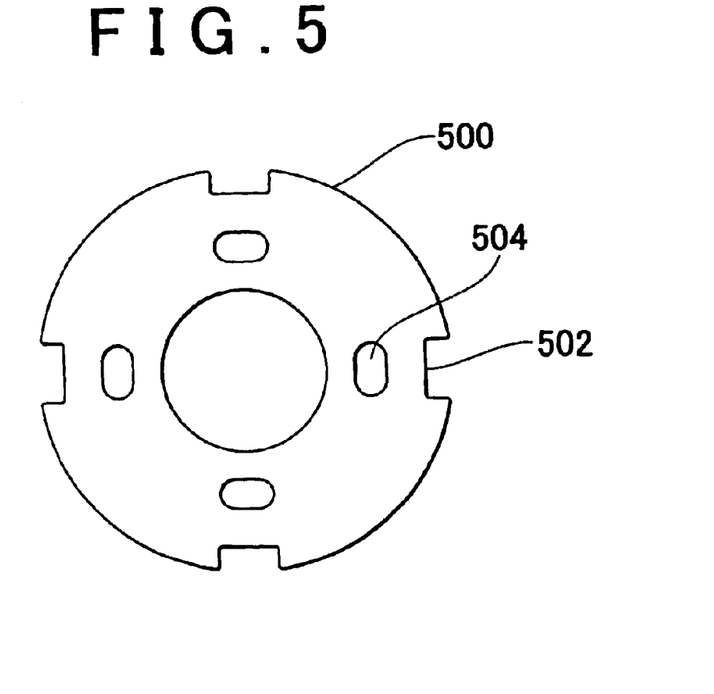
FIG. 5 is a view showing a thrust bearing race according to the first embodiment of the invention.

Referring next to FIG. 5, the configuration of the thrust bearing race 500 according to the present embodiment will be described. The thrust bearing race 500 is provided with thrust bearing race notches 502 and thrust bearing race oil holes 504. These notches 502 and holes 504 are formed at predetermined positions. More specifically, the number and positions of the thrust bearing race notches 502 and thrust bearing race oil holes 504 are determined in accordance with the number and positions of the OWC outer race notches 302 and the oil grooves 304 as shown in FIG. 4. With this arrangement, lubrication paths from the thrust bearing race oil holes 504 to the thrust bearing notches 502 are surely provided by the oil grooves 304. Accordingly, the thrust bearing race 500 can be lubricated irrespective of the phase of the stator.

Figure 6:
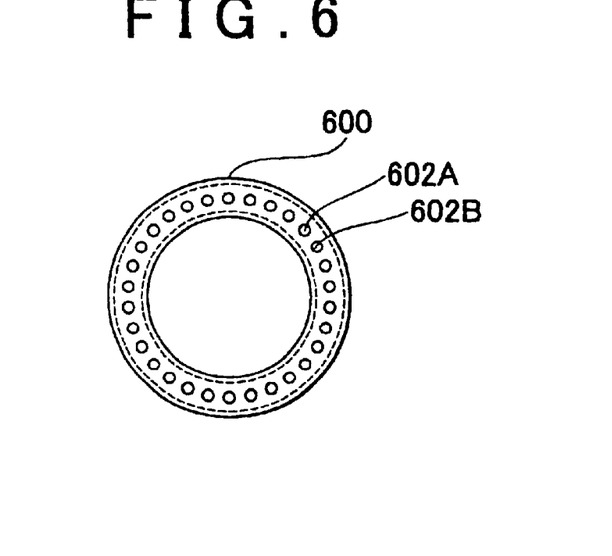
FIG. 6 is a view showing the configuration of a one-way clutch end bearing according to the first embodiment of the invention.

Referring next to FIG. 6, the configuration of the OWC end bearing 600 according to the present embodiment will be described. FIG. 6 is a cross-sectional view of the OWC end bearing 600. The outside diameter of the OWC end bearing 600 is slightly smaller than the inside diameter of the OWC outer race 300. Namely, a certain clearance is provided between the outer circumference of the OWC end bearing 600 and the inner circumference of the OWC outer race 300. The inside diameter of the OWC end bearing 600 is slightly larger than the outside diameter of the OWC inner race 700. Namely, a certain clearance is provided between the inner circumference of the OWC end bearing 600 and the outer circumference of the OWC inner race 700. The OWC end bearing 600 restricts movements of the sprags 702 in the axial direction while appropriately maintaining (holding) the spacing between the OWC outer race 300 and the OWC inner race 700.

The OWC end bearing 600 is provided with a plurality of OWC end bearing oil holes 602 (for example, first oil hole 602A, second oil hole 602B and so on). These oil holes 602 are formed so as to correspond to the positions of the thrust bearing race oil holes 504 (FIG. 5) formed in the thrust bearing race 500. Namely, the oil holes 602, 504 are formed such that the circumference on which the OWC end bearing oil holes 602 are provided overlies or coincides with the circumference on which the thrust bearing race oil holes 504 are provided. The interval of the oil holes 602 is determined such that lubrication paths are surely provided by the oil holes 602 and the thrust bearing race oil holes 504 irrespective of the phase of the OWC end bearing 600.

For example, referring to FIG. 6, the first oil hole 602A and the second oil hole 602B located adjacent to each other are formed so as to appear in or communicate with the thrust bearing race oil hole 504. Thus, even if the OWC end bearing 600 is disposed between the thrust bearing outer race 500 and the sprags 702, the sprags 702 can be lubricated. It is to be understood that the shape, position and number of the OWC end bearing oil holes 602 are not limited to those of this embodiment (FIG. 6), but may be determined as desired provided that lubrication paths are ensured.

In the support device of the stator 200 according to the present embodiment as described above, the end face of the OWC outer race 300 is able to bear a load applied to the corresponding thrust bearing 400, via the corresponding thrust bearing race 500. Since the rigidity of the OWC outer race 300 is high enough to bear or sustain the load, there is no need to increase the thickness of the thrust bearing race 500. Accordingly, the axial length or dimension of the thrust bearing race 500 can be reduced.

Also, the thrust bearing race 500 restricts axial movements of the corresponding OWC end bearing 600, and also restricts movements of the OWC inner race 700. Accordingly no exclusive component is required for restricting the movements of the OWC inner race 700, resulting in a reduction in the number of components that constitute the stator support device.

Furthermore, the OWC outer race oil grooves 304 formed in the end face of the OWC outer race 300 ensure sufficient lubrication of the interior of the torque converter 100. Accordingly, an otherwise possible reduction in the lifetime of the thrust bearing races 500 due to poor lubrication can be avoided or suppressed.

With a reduction in the number of components arranged in the axial direction, "backlash" during assembling is reduced, and therefore a thrust clearance adjustment process can be simplified or eliminated. In addition, a lock-up piston 112 is positioned with improved accuracy, and therefore controls associated with the torque converter 100, e.g., lock-up clutch control, can be performed with improved accuracy.

Second Embodiment

Hereinafter, a stator support device according to a second embodiment of the invention will be described. The construction of the stator support device according to this embodiment is difference from that of the first embodiment as described above in that the invention is applied to only one end face of the one-way clutch.

Figure 7:
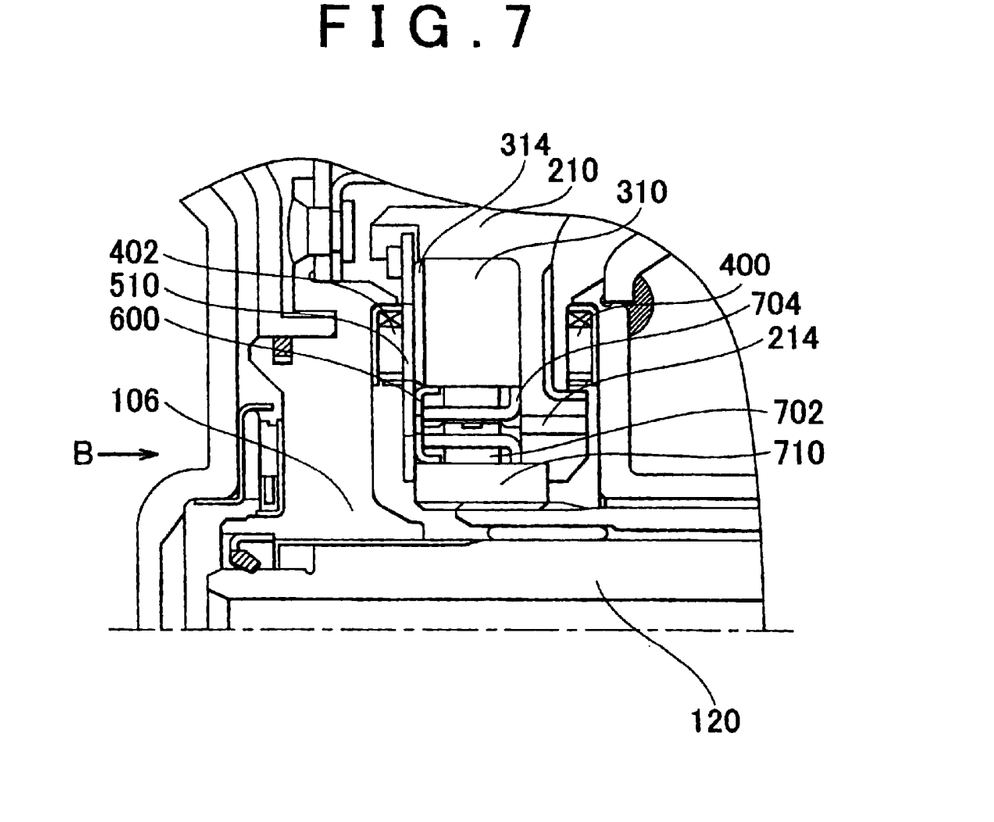
FIG. 7 is a view showing the construction of a stator support device according to a second embodiment of the invention.

Referring to FIG. 7, the construction of the stator support device according to the second embodiment will be described. The structure of the torque converter including the pump impeller, turbine runner and stator is identical with the structure of the torque converter 100 (shown in a portion of FIG. 1 located above the A—A line) according to the first embodiment as described above, and thus will not be repeatedly described herein. Also, the positional relationship among OWC outer race 310, OWC inner race 710, sprags 702 and cage 704 is the same as that in the structure of the stator support device according to the first embodiment, and thus will not be repeatedly described herein.

As shown in FIG. 7, an OWC end bearing 600 is disposed only at one end face of the one-way clutch, between the OWC outer race 310 and the OWC inner race 710.

Also, a radially inner portion of the stator 210, which is located at one axial end thereof, is shaped so as to restrict axial movements of the OWC outer race 310, cage 704 and the OWC inner race 710, as described later. The radially inner portion of the stator 210 is also shaped so as to prevent axial and radial movements (such as axial displacement, radial oscillations, and the like) of the OWC inner race 710. This arrangement makes it possible to maintain the spacing between the OWC outer race 310 and the OWC inner race 710 without using a means, such as an end bearing, for maintaining the spacing between the OWC outer race 310 and the OWC inner race 710.

Figure 8:
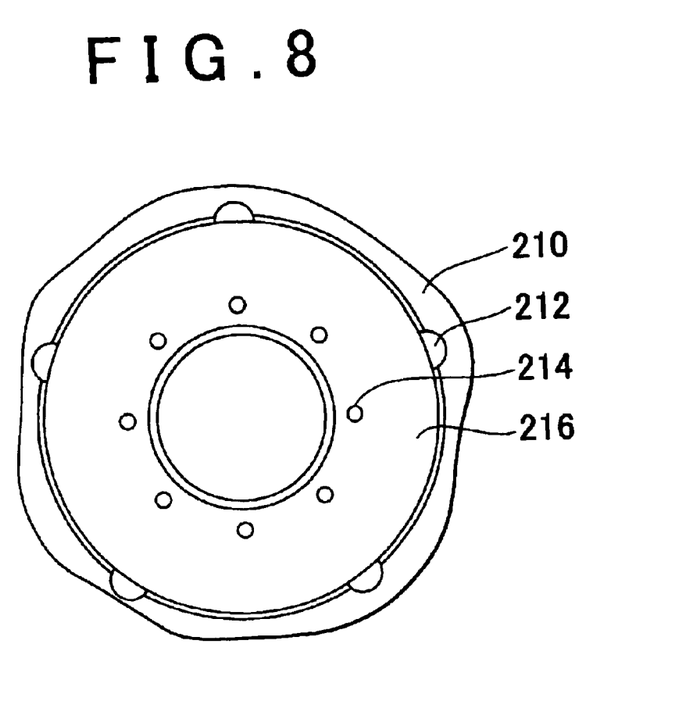
FIG. 8 is a cross-sectional view showing a wheel portion of the stator according to the second embodiment of the invention.

FIG. 8 is a cross-sectional view of a wheel portion of the stator 210 according to the present embodiment. The view of FIG. 8 is a projection of the stator 210 as seen in the direction of the arrow B in FIG. 7.

As shown in FIG. 8, the stator 210 is provided with stator notches 212 for fixing the thrust bearing race 510 in position as described later. The inside diameter of the radially inner portion 216 of the stator 210 is set to such a dimension as to restrict the axial movements of the OWC inner race 710. Oil holes 214 that permit flow of lubricating oil are formed in the stator inner portion 216.

Figure 9:
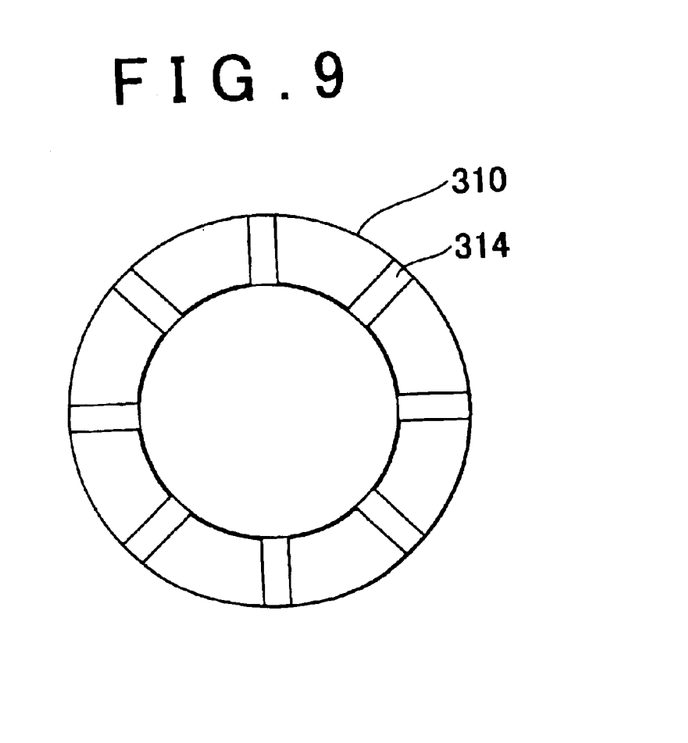
FIG. 9 is a view showing an end face of a one-way clutch outer race according to the second embodiment of the invention.

Referring next to FIG. 9, the configuration of the OWC outer race 310 disposed at the inner circumference of the stator 210 according to the present embodiment will be described. The view of FIG. 7 is a projection of the OWC outer race 310 as seen in the direction of the arrow B in FIG. 7.

The OWC outer race 310 is provided with a plurality of OWC outer race oil grooves 314. The interval of the oil grooves 314 is determined so that lubrication paths are sure to be provided irrespective of the phase of rotation of the OWC outer race 310 relative to the thrust bearing race 510. With the oil grooves 314 thus provided, the interior of the torque converter can be sufficiently lubricated.

Figure 10:
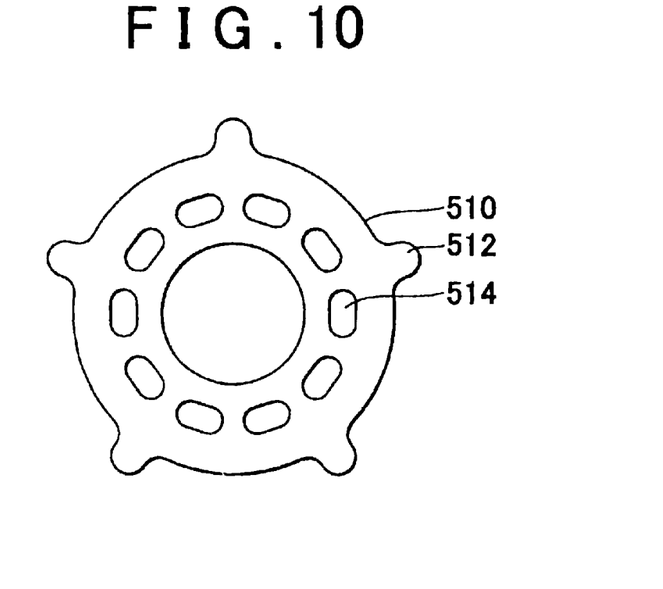
FIG. 10 is a view showing a thrust bearing race according to the second embodiment of the invention.

Referring next to FIG. 10, the configuration of the thrust bearing race 510 disposed within the stator 210 according to the present embodiment will be described. The thrust bearing race 510 is provided at its outer peripheral portion with thrust bearing race claws 512. The size and positions of the claws 512 are determined in accordance with the size and positions of the stator notches 212 provided at the inner circumference of the stator 210 as described above.

The thrust bearing race 510 is also provided with a plurality of thrust bearing race oil holes 514. The thrust bearing race oil holes 514 are formed so as to ensure sufficient lubrication of the OWC and the interior of the torque converter, irrespective of the positional relationship with the OWC outer race oil grooves 314 (FIG. 9) in the direction of rotation. With this arrangement, an otherwise possible reduction in the lifetime of the OWC and the torque converter due to poor lubrication can be avoided or suppressed.

In the support device of the stator 210 according to the second embodiment, the OWC outer race 310 bears a load applied to the thrust bearing 402, via the thrust bearing race 510 disposed at one end face of the outer race 310. Furthermore, the thrust bearing race 510 restricts axial movements of the OWC end bearing 600 that appropriately maintains the spacing between the OWC outer race 310 and the OWC inner race 710, and also restricts axial movements of the OWC inner race 710. Thus, no exclusive component is required for restricting the movements of the OWC end bearing 600, resulting in a reduction in the number of components arranged in the axial direction, and a reduced error in the axial dimension of the support device.

Also, the OWC outer race 310 contacts at the other end face thereof with an inner surface of the radially inner portion 216 of the stator 210. Thus, the stator inner portion 216 functions as a thrust bearing and an end bearing, resulting in a reduction in the number of components. As a result, the axial length of the torque converter as a whole, which includes the stator 210 constructed as described above, can be reduced.

Third Embodiment

Hereinafter, a stator support device according to a third embodiment of the invention will be described. The construction of the stator support device according to the third embodiment is different from those of the first and second embodiments in that thrust bearing races having different thicknesses are disposed at respective end faces of the OWC outer race.

Figure 11:
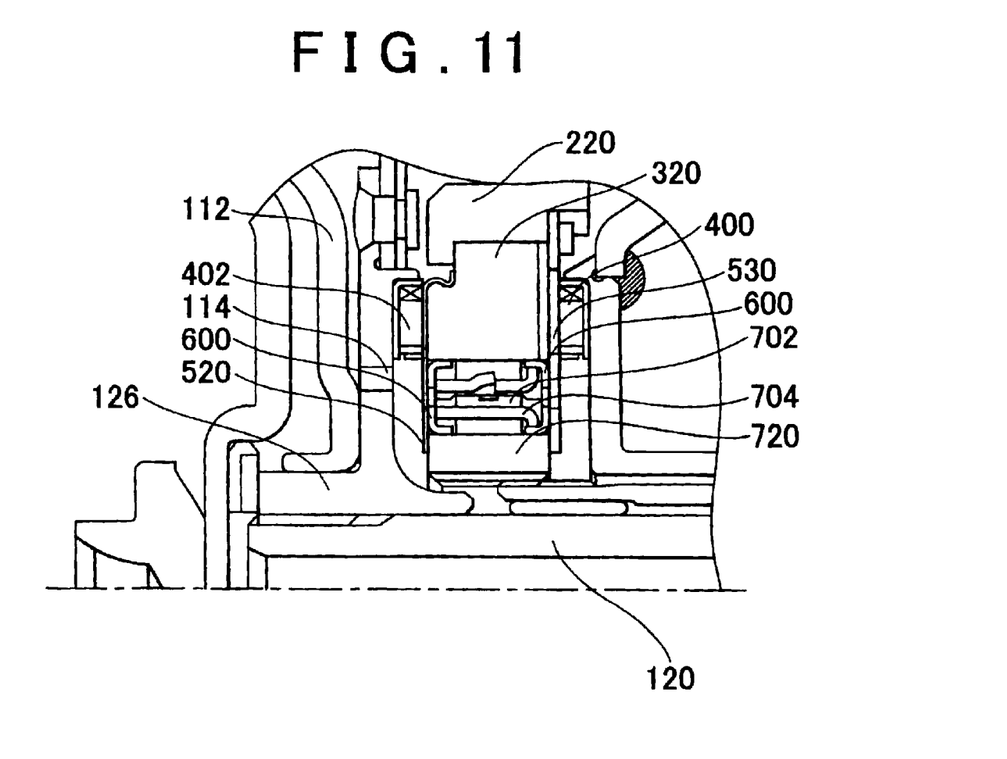
FIG. 11 is a view showing the construction of a stator support device according to a third embodiment of the invention.

Referring to FIG. 11, the construction of the stator support device according to the third embodiment will be described. The structure of the torque converter including the pump impeller, turbine runner and the stator is identical with the structure of the torque converter 100 (shown in a portion of FIG. 1 located above the A—A line) according to the first embodiment as described above, and thus will not be repeatedly described herein. Also, the positional relationship among OWC outer race 320, OWC inner race 720, sprags 702 and cage 704 is the same as that in the structure of the stator support device according to the first embodiment, and thus will not be repeatedly described herein.

As shown in FIG. 11, oil holes 114 are formed in a turbine hub 126, to provide lubrication paths that communicate a portion of the torque converter including a lock-up piston 112 with a portion thereof including a thrust bearing 402. With this arrangement, working oil present around a clutch lining 108 (FIG. 1) that generates a large quantity of heat can be efficiently discharged to the outside of the torque converter 100, thus assuring improved durability of the clutch lining 108.

The stator support device according to the present embodiment includes a thrust bearing race 520 disposed at one end face of the OWC outer race 320 that is closer to the turbine hub 126, and a thrust bearing race 530 disposed at the other end face of the outer race 320. The thrust bearing race 520 has a smaller thickness than the thrust bearing race 530. Since the oil holes 114 of the turbine hub 126 as mentioned above provide lubrication paths within the torque converter, thus eliminating the need to form oil grooves in the OWC outer race, the required rigidity of the thrust bearing race 520 can be lowered, thus permitting the use of the race 520 having a relatively small thickness. With this arrangement, the axial length of the support device can be reduced as compared with the case where two thrust bearing races having the same thickness are used (as in the first embodiment). Accordingly, the axial length or dimension of the torque converter 100 is reduced. With the thickness of the thrust bearing race 520 thus reduced, lubrication paths for lubricating the interior of the torque converter may be provided between thrust bearing cages, thus eliminating the need to form oil grooves in the outer race.

Figure 12:
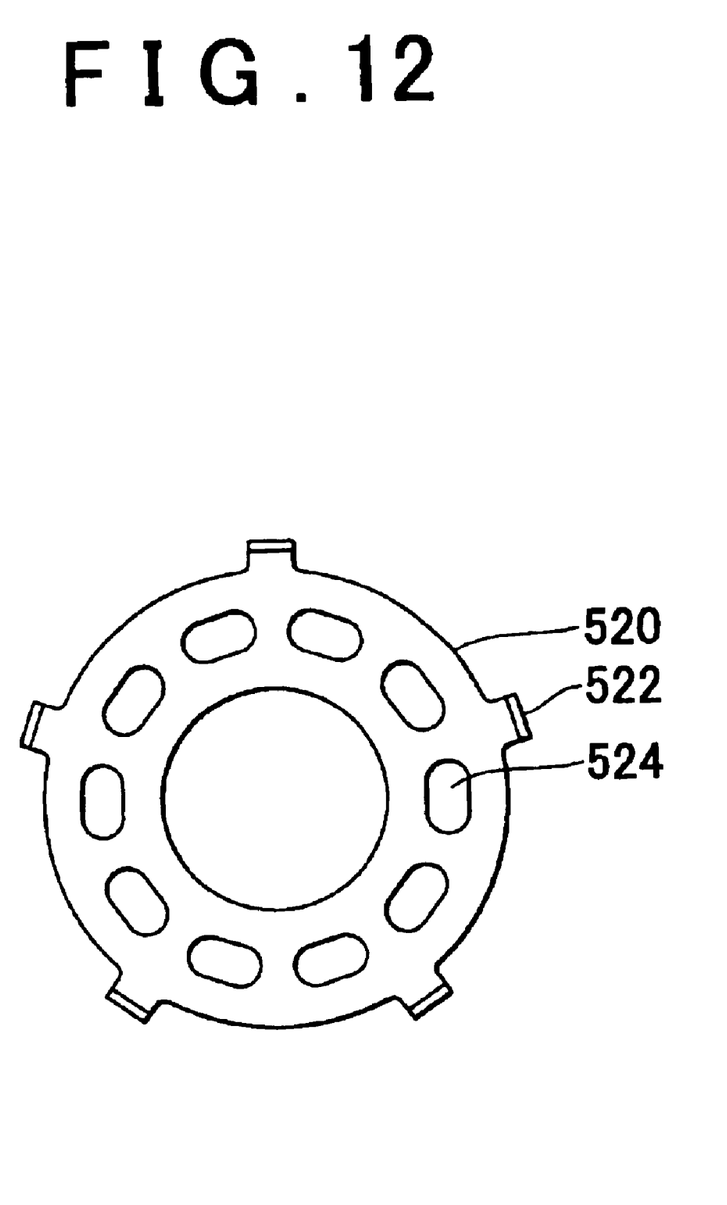
FIG. 12 is a view showing a thrust bearing race according to the third embodiment of the invention.

Referring to FIG. 12, the configuration of a cross section of the thrust bearing race 520 according to the third embodiment will be described. The thrust bearing race 520 is provided with a plurality of thrust bearing race claws 522 and a plurality of thrust bearing race oil holes 524. The position of the thrust bearing race 520 relative to the OWC outer race 320 is fixed by the thrust bearing race claws 522. The thrust bearing race oil holes 524 cooperate with OWC end bearing oil holes 602 (shown in FIG. 6) to form lubrication paths. Namely, even if the positional relationship of the thrust bearing race oil holes 524 with the end bearing oil holes 602 in the circumferential direction is changed, the lubricant paths are surely provided, and the torque converter is kept appropriately lubricated.

In the support device of the stator 220 according to the present embodiment, the thickness of the thrust bearing race 520 disposed at one end face of the one-way clutch outer race 320 is made smaller than that of the thrust bearing race 530 disposed at the other end face, so that the axial length of the stator upon assembling can be further reduced. Also, the arrangement of the stator support device of this embodiment makes it possible to lubricate the back face of the lock-up piston 112 so as to cool the clutch lining 108, and therefore an otherwise possible reduction in the lifetime of the torque converter due to poor lubrication can be avoided or suppressed.

In the stator support devices according to the first through third embodiments of the invention as described above in detail, the OWC outer race bears the load applied to the thrust bearing, via the thrust bearing race disposed at an (or each) end face of the outer race. Since the rigidity of the OWC outer race is high enough to bear or sustain the load, a reduction in the lifetime of the thrust bearing can be avoided or suppressed. In addition, the thickness of the thrust bearing race can be minimized, and the axial length of the stator support device can be reduced accordingly.

Furthermore, the spacing between the OWC outer race and the OWC inner race can be appropriately maintained by the OWC end bearing, oscillations occurring during rotation of the one-way clutch and offset or displacement of the center of rotation of each race are prevented. Consequently, the lifetime of the one-way clutch can be improved.

Also, the thrust bearing race, OWC outer race and the OWC end bearing are provided with oil grooves or oil holes so that lubrication paths can be surely provided irrespective of the rotating state of the stator. Thus, the stator support device is always subjected to appropriate lubrication. Furthermore, the lubricating oil grooves provided at the end faces of the one-way clutch facilitate lubrication of the interior of the torque converter. Consequently, the durability of the stator and other components (such as a clutch lining) that constitute the torque converter can be improved.

With the arrangement in which the thrust bearing race has the function of bearing the load of the thrust bearing and the function of restricting movements of the OWC end bearing and the OWC inner race, the number of components arranged in the axial direction can be reduced. As a result, errors in assembling of the stator can be reduced, and the axial length of the stator can be reduced, resulting in a reduction in the axial length of the torque converter including the stator. Furthermore, the improvement in the assembling accuracy leads to an improvement in the accuracy with which the torque converter (e.g., a lock-up clutch) is controlled.

It is to be understood that the illustrated embodiments are merely exemplary, and the invention is not limited to details of the illustrated embodiments. The scope of the invention is not defined by the above description of the embodiments, but defined by the appended claims. It is also to be understood that the invention may be embodied with various changes, modifications, or improvements, without departing from the scope of the invention as defined in the appended claims, and equivalents thereof.

What is claimed is:

1. A stator support device for supporting a stator of a torque converter, comprising:

a one-way coupling device including an outer race provided with at least one oil groove and disposed radially inwardly of the stator, and an inner race disposed radially outwardly of a rotation axis of the torque converter;

an end bearing that holds a spacing between the outer race and the inner race;

a thrust bearing race provided with at least one oil hole that communicates with the at least one oil groove of the outer race and disposed adjacent to an end face of the outer race and arranged to restrict movements of the end bearing in a direction of the rotation axis; and a thrust bearing disposed on a transfer surface of the thrust bearing race and adapted to bear a load applied to the one-way coupling device.

2. The stator support device according to claim 1, wherein the thrust bearing race is shaped so as to restrict movements of the end bearing and the inner race in the direction of the rotation axis.

3. The stator support device according to claim 1, wherein the thrust bearing race is disposed adjacent to each of the opposite end faces of the outer race, and the thrust bearing is disposed with respect to each of the opposite end faces of the outer race.

4. The stator support device claim 3, wherein the thrust bearing race disposed adjacent to one of the opposite end faces of the outer race has a smaller thickness than the thrust bearing race disposed adjacent to the other end face of the outer race.

5. A torque converter including a stator support device for supporting a stator of the torque converter, wherein the stator support device comprises:

a one-way coupling device including an outer race provided with at least one oil groove and disposed radially inwardly of the stator, and an inner race disposed radially outwardly of a rotation axis of the torque converter;

an end bearing that holds a spacing between the outer race and the inner race;

a thrust bearing race provided with at least one oil hole that communicates with the at least one oil groove of the outer race and disposed adjacent to an end face of the outer race and arranged to restrict movements of the end bearing in a direction of the rotation axis; and a thrust bearing disposed on a transfer surface of the thrust bearing race and adapted to bear a load applied to the one-way coupling device.

6. A stator support device for supporting a stator of a torque converter, comprising:

a one-way coupling device including an outer race disposed radially inwardly of the stator, and an inner race disposed radially outwardly of a rotation axis of the torque converter;

an end bearing that holds a spacing between the outer race and the inner race;

a thrust bearing race disposed adjacent to an end face of the outer race and arranged to restrict movements of the end bearing in a direction of the rotation axis; and a thrust bearing disposed on a transfer surface of the thrust bearing race and adapted to bear a load applied to the one-way coupling device, wherein the thrust bearing race is disposed adjacent to each of the opposite end faces of the outer race, and the thrust bearing is disposed with respect to each of the opposite end faces of the outer race, and wherein the thrust bearing race disposed adjacent to one of the opposite end faces of the outer race has a smaller thickness than the thrust bearing race disposed adjacent to the other end face of the outer race.

* * * * *